(12) United States Patent
Choi

(10) Patent No.: US 12,033,402 B2
(45) Date of Patent: Jul. 9, 2024

(54) DRIVER ASSISTANCE APPARATUS

(71) Applicant: HL KLEMOVE CORP., Incheon (KR)

(72) Inventor: Seungrhi Choi, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 268 days.

(21) Appl. No.: 17/235,341

(22) Filed: Apr. 20, 2021

(65) Prior Publication Data

US 2021/0323550 A1 Oct. 21, 2021

(30) Foreign Application Priority Data

Apr. 21, 2020 (KR) ........................ 10-2020-0048003

(51) Int. Cl.
*G06V 20/56* (2022.01)
*B60W 30/12* (2020.01)
(Continued)

(52) U.S. Cl.
CPC ........... *G06V 20/588* (2022.01); *B60W 30/12* (2013.01); *B60W 50/14* (2013.01); *B60W 10/04* (2013.01);
(Continued)

(58) Field of Classification Search
CPC .... G06V 20/588; B60W 30/12; B60W 50/14; B60W 10/04; B60W 10/10; B60W 10/18; B60W 10/20; B60W 2420/42; B60W 2420/52; B60W 2520/10; B60W 2520/12; B60W 2520/14; B60W 2520/28; B60W 2540/18; B60W 40/06; B60W 40/105; B60R 21/0134; G01S 13/931; B60Y 2400/30
See application file for complete search history.

(56) References Cited

U.S. PATENT DOCUMENTS

2018/0129854 A1\* 5/2018 Jeon ................... G06T 19/006
2018/0286095 A1\* 10/2018 Kusayanagi ............. H04N 7/18
2020/0049513 A1\* 2/2020 Ma ....................... G05D 1/0088

FOREIGN PATENT DOCUMENTS

JP 2002092796 A \* 3/2002 ......... G06K 9/00798
JP 3365168 B2 1/2003
(Continued)

OTHER PUBLICATIONS

Office Action issued May 24, 2023 for counterpart Korean Patent Application No. 10-2020-0048003 (See English Translation).

*Primary Examiner* — Peter D Nolan
*Assistant Examiner* — Michael F Whalen
(74) *Attorney, Agent, or Firm* — Hauptman Ham, LLP

(57) ABSTRACT

Provided is an apparatus for assisting driving of a vehicle, the apparatus comprising: a front camera mounted on a vehicle and having a field of view in front of the vehicle, the front camera configured to acquire front image data; a dynamics sensor mounted on the vehicle and configured to acquire dynamics data that is a motion state of the vehicle; and a controller including a processor configured to process the front image data and the dynamics data, wherein the controller is configured to generate a front virtual lane on the basis of the field of view in front of the vehicle based on the front image data, and generate a rear virtual lane on the basis of the field of view in rear of the vehicle based on the front virtual lane and the dynamics data.

19 Claims, 11 Drawing Sheets

(51) Int. Cl.
  *B60W 50/14*   (2020.01)
  *B60W 10/04*   (2006.01)
  *B60W 10/10*   (2012.01)
  *B60W 10/18*   (2012.01)
  *B60W 10/20*   (2006.01)

(52) U.S. Cl.
  CPC ............ *B60W 10/10* (2013.01); *B60W 10/18* (2013.01); *B60W 10/20* (2013.01); *B60W 2420/403* (2013.01); *B60W 2420/408* (2024.01); *B60W 2520/10* (2013.01); *B60W 2520/12* (2013.01); *B60W 2520/14* (2013.01); *B60W 2520/28* (2013.01); *B60W 2540/18* (2013.01)

(56) References Cited

FOREIGN PATENT DOCUMENTS

| | | | |
|---|---|---|---|
| KR | 101428094 B1 | | 8/2014 |
| KR | 20170070580 A | * | 6/2017 |
| WO | WO-2020262716 A1 | * | 12/2020 |

* cited by examiner

DRIVER ASSISTANCE APPARATUS

CROSS-REFERENCE TO RELATED APPLICATION

This application is based on and claims priority under 35 U.S.C. § 119 to Korean Patent Application No. 2020-0048003, filed on Apr. 21, 2020 in the Korean Intellectual Property Office, the disclosure of which is incorporated herein by reference.

BACKGROUND

1. Field

The present disclosure relates to a driver assistance system, and more particularly, to a driver assistance system for identifying a lane through a camera.

2. Description of the Related Art

Recently, in order to reduce the burden on the driver and improve convenience, studies on vehicles equipped with an advanced driver assistance system (ADAS) that actively provides information on vehicle state, driver state, and surrounding environment has been actively conducted.

In addition to sensing obstacles, the driver assistance system is essential to recognize the driving lane. Generally, lane recognition considers only the lane at the front to perform lane departure warning (LDVV) or lane keeping assist (LKA).

However, the driver assistance system needs to grasp the all-round driving environment of the vehicle, but the reality is that a device for identifying the rear lane is insufficient.

SUMMARY

Therefore, it is an aspect of the present disclosure to provide a driver assistance system capable of estimating a rear lane through a front camera.

In accordance with one aspect of the present disclosure, there is provided an apparatus for assisting driving of a vehicle, the apparatus comprising: a front camera mounted on the vehicle and having a field of view in front of the vehicle, the front camera configured to acquire front image data; a dynamics sensor mounted on the vehicle and configured to acquire dynamics data that is a motion state of the vehicle; and a controller including a processor configured to process the front image data and the dynamics data, wherein the controller is configured to generate a front virtual lane on the basis of the field of view in front of the vehicle based on the front image data, and generate a rear virtual lane on the basis of a field of view in rear of the vehicle based on the front virtual lane and the dynamics data.

The controller may acquire a moving distance of the vehicle based on traveling speed information of the vehicle from a first position to a second position, calculate a required time from the first position to the second position, and generate the rear virtual lane based on the front virtual lane before the required time if the vehicle is in the second position.

The controller may generate an entire virtual lane in which the front virtual lane and the rear virtual lane at the second position are connected to each other.

The controller may calculate a curvature of the front virtual lane at the second position and a curvature of the rear virtual lane at the second position, generate a side virtual lane on the basis of a field of view on a side of the vehicle based on the curvature of the front virtual lane at the second position and the curvature of the rear virtual lane at the second position, and generate an entire virtual lane in which the front virtual lane, the side virtual lane, and the rear virtual lane are connected to each other.

The controller may calculate an amount of change in the curvature of the front virtual lane at the second position and an amount of change the change in the curvature of the rear virtual lane at the second position, and generate the side virtual lane.

The controller may receive a steering angle of the vehicle, and regenerate the rear virtual lane based on the steering angle.

The driver assistance system according to an embodiment may further include a radar sensor mounted on a vehicle and having a sensing field of view in rear of the vehicle, the radar sensor configured to sense a rear obstacle, wherein the controller may output a warning signal if the rear obstacle is sensed and the rear obstacle departs the rear virtual lane.

The dynamics sensor includes a wheel speed sensor, a steering angle sensor, and a yaw rate sensor, and is configured to obtain a traveling speed, a steering angle, and a yaw rate of the vehicle.

In accordance with one aspect of the present disclosure, there is provided an apparatus for assisting driving of a vehicle, the apparatus comprising: a front camera mounted on the vehicle and having a field of view in front of the vehicle, the front camera configured to acquire front image data; A dynamics sensor mounted on the vehicle and configured to acquire dynamics data that is a motion state of the vehicle; and a controller including a processor configured to process the front image data and the dynamics data, wherein the controller is configured to convert the front image data into rear image data on the basis of a field of view in rear of the vehicle, and generate a rear image of the vehicle based on the dynamics data and the rear image data.

The controller may generate a rear virtual lane on the basis of the field of view in rear of the vehicle based on the rear image.

The controller may acquire a moving distance of the vehicle based on traveling speed information of the vehicle from a first position to a second position, calculate a required time from the first position to the second position, and generate the rear virtual lane based on the front virtual lane before the required time if the vehicle is in the second position.

The controller may generate an entire virtual lane in which the front virtual lane and the rear virtual lane at the second position are connected to each other.

The controller may calculate a curvature of the front virtual lane at the second position and a curvature of the rear virtual lane at the second position, generate a side virtual lane on the basis of a field of view on a side of the vehicle based on the curvature of the front virtual lane at the second position and the curvature of the rear virtual lane at the second position, and generate an entire virtual lane in which the front virtual lane, the side virtual lane, and the rear virtual lane are connected to each other.

The controller may calculate the amount of change in the curvature of the front virtual lane at the second position and the amount of change in the curvature of the rear virtual lane at the second position, and generate the side virtual lane.

The controller may receive a steering angle of the vehicle, and regenerate the rear virtual lane based on the steering angle.

The driver assistance system according to an embodiment may further include a radar sensor mounted on a vehicle and having a sensing field of view in rear of the vehicle, the radar sensor configured to sense a rear obstacle, wherein the controller may output a warning signal if the rear obstacle is sensed and the rear obstacle departs the rear virtual lane.

The dynamics sensor includes a wheel speed sensor, a steering angle sensor, and a yaw rate sensor, and is configured to obtain a traveling speed, a steering angle, and a yaw rate of the vehicle.

In accordance with one aspect of the present disclosure, there is provided a method of controlling an apparatus for assisting driving of a vehicle, the method comprising: acquiring front image data and dynamics data; generating a front virtual lane on the basis of a field of view in front of the vehicle based on the front image data; and generating a rear virtual lane on the basis of a field of view in rear of the vehicle based on the front virtual lane and the dynamics data.

The generating of the rear virtual lane includes acquiring a moving distance of the vehicle based on traveling speed information of the vehicle from a first position to a second position, calculating a required time from the first position to the second position, and generating the rear virtual lane based on the front virtual lane before the required time if the vehicle is in the second position.

The driver assistance method according to an embodiment may further include: calculating a curvature of the front virtual lane at the second position and a curvature of the rear virtual lane at the second position, generating a side virtual lane on the basis of a field of view on a side of the vehicle based on the curvature of the front virtual lane at the second position and the curvature of the rear virtual lane at the second position, and generating an entire virtual lane in which the front virtual lane, the side virtual lane, and the rear virtual lane are connected to each other.

The controller may acquire front coordinate information for the front virtual lane, acquire rear coordinate information for the rear of the vehicle through a predetermined transformation matrix in which the vehicle and an angular velocity of the vehicle are reflected in the front coordinate information, generate the rear virtual lane based on the rear coordinate information, and perform a lane keeping assist (LKA) and a lane following assist (LFA) based on the rear virtual lane. BRIEF

DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
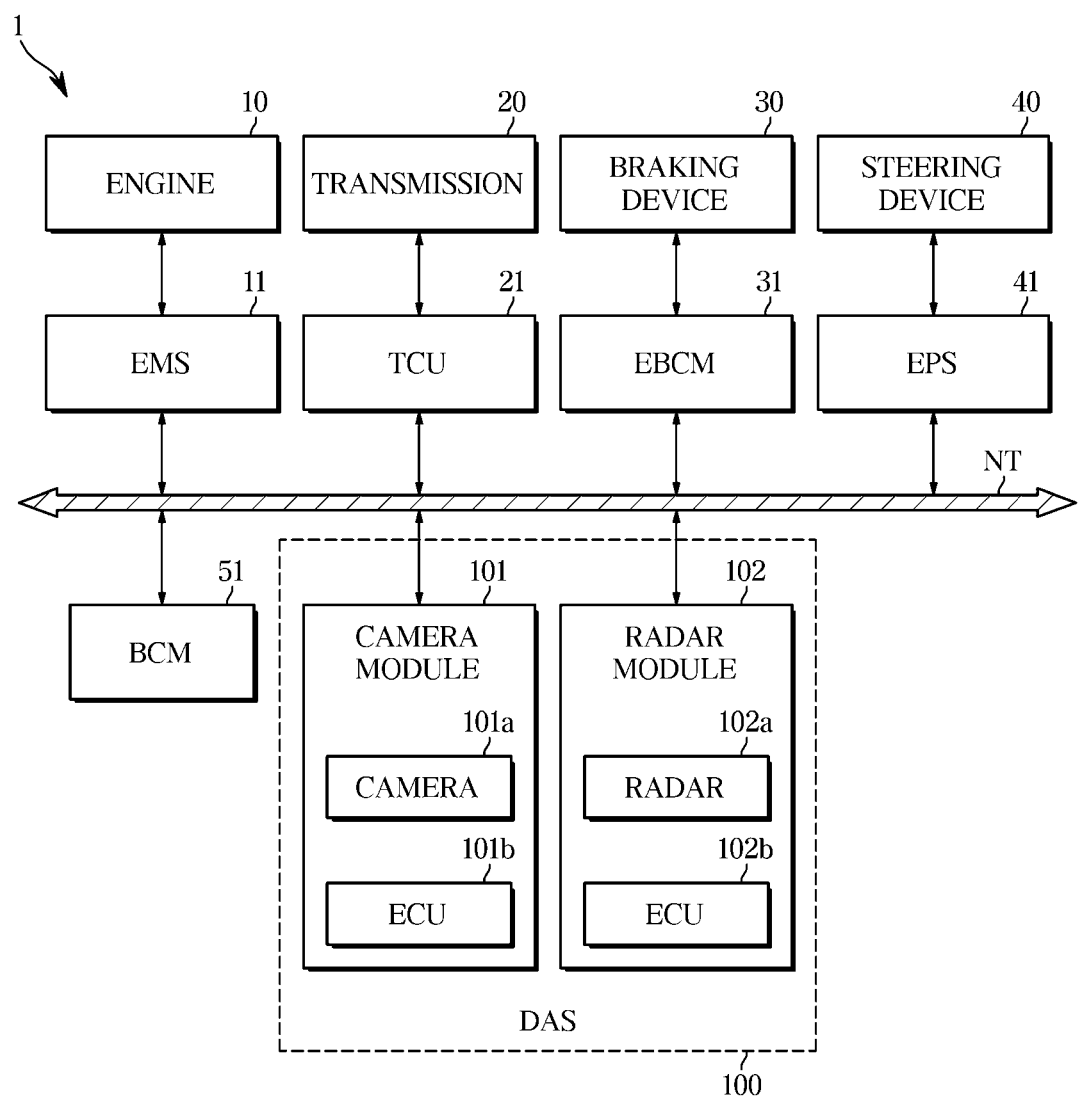
FIG. 1 illustrates a configuration of a vehicle according to an embodiment.

Like numerals refer to like elements throughout the specification. Not all elements of embodiments of the present disclosure will be described, and description of what are commonly known in the art or what overlap each other in the embodiments will be omitted.

The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it should be understood that, when a member is referred to as being "on/under" another member, it can be directly on/under the other member, or one or more intervening members may also be present.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

FIG. 1 illustrates a configuration of a vehicle according to an embodiment.

As shown in FIG. 1, the vehicle 1 includes an engine 10, a transmission 20, a braking device 30, and a steering device 40. The engine 10 includes a cylinder and a piston, and may generate power for the vehicle 1 to travel. The transmission 20 includes a plurality of gears, and may transmit power generated by the engine 10 to a wheel. The braking device 30 may decelerate the vehicle 1 or stop the vehicle 1 through friction with the wheel. The steering device 40 may change the driving direction of the vehicle 1.

For example, the vehicle 1 further includes an engine management system (EMS) 11, a transmission control unit (TCU) 21, and an electronic brake control module (EBCM) 31), an electronic power steering (EPS) 41, a body control module (BCM), and an advanced driver assistance system (ADAS).

The EMS 11 may control the engine 10 in response to acceleration intent of a driver through an accelerator pedal or a request of an advanced driver assistance system (ADAS) 100. For example, the EMS 11 may control the torque of the engine 10.

The TCU 21 may control the transmission 20 in response to a shift command of the driver through a shift lever and/or a travelling velocity of the vehicle 1. For example, the TCU 21 may adjust the gear ratio from the engine 10 to the vehicle wheels.

The EBCM 31 may control the braking device 30 in response to a braking intent of a driver through a braking pedal and/or a slip of the vehicle wheels. For example, the EBCM 31 may temporarily release the braking of the vehicle wheel in response to a slip of the vehicle wheel sensed at a time of braking of the vehicle 1 (anti-lock braking systems, ABS). The EBCM 31 may selectively release braking of the vehicle wheel in response to over-steering and/or under-steering sensed at a time of steering of the vehicle 1 (electronic stability control, ESC). In addition, the EBCM 31 may temporarily brake the vehicle wheels in response to a slip of the vehicle wheel sensed at a time of driving of the vehicle 1 (traction control system, TCS).

The EPS 41 may assist the operation of the steering device 40 so that the driver easily manipulates the steering wheel, in response to a steering intent of the driver through the steering wheel. For example, the EPS 41 may assist the operation of the steering device 40 such that the steering force is reduced during low-velocity traveling or parking and is increased during high-velocity traveling.

The BCM 51 may control the operation of the electronic components that provide convenience to the driver or ensure the safety of the driver. For example, the BCM 51 may control a head lamp, a wiper, a cluster, a multifunction switch, a turn signal lamp, and the like.

The ADAS 100 may assist the driver in manipulating (driving, braking, steering) the vehicle 1. For example, the ADAS 100 may detect a surrounding environment (e.g., another vehicle, a pedestrian, a cyclist, a lane, a road sign, etc.) around the vehicle 1 and control the driving and/or braking and/or steering of the vehicle 1 in response to the sensed surrounding environment.

The ADAS 100 may provide the driver with various functions. For example, the DAS 60 may provide a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

The ADAS 100 may include a camera module 101 for acquiring image data around the vehicle 1 and a radar module 102 for acquiring obstacle data around the vehicle 1. The camera module 101 may include a camera 101a and an electronic control unit (ECU) 101b, and may photograph the front of the vehicle 1 and recognize other vehicles, pedestrians, cyclists, lanes, road signs, and the like.

The radar module 102 may include a radar 102a and an electronic control unit (ECU) 102b and may acquire relative positions and relative velocities of obstacles (e.g., other vehicles, pedestrians, cyclists, and the like) around the vehicle 1.

The DAS 100 is not limited to the diagram illustrated in FIG. 1, and may further include a LiDAR configured to scan around the vehicle 1 and sense the obstacles.

The above described electronic components may communicate with each other through vehicle communication network (NT). For example, the electrical components may exchange data therebetween through Ethernet, media oriented systems transport (MOST), Flexray, controller area network (CAN), local interconnect network (LIN), and the like. For example, the DAS 100 may transmit a driving control signal, a driving signal, and a steering signal to the EMS 11, the electronic braking control module 31, and the EPS 41 through a vehicle communication network NT, respectively.

Figure 2:
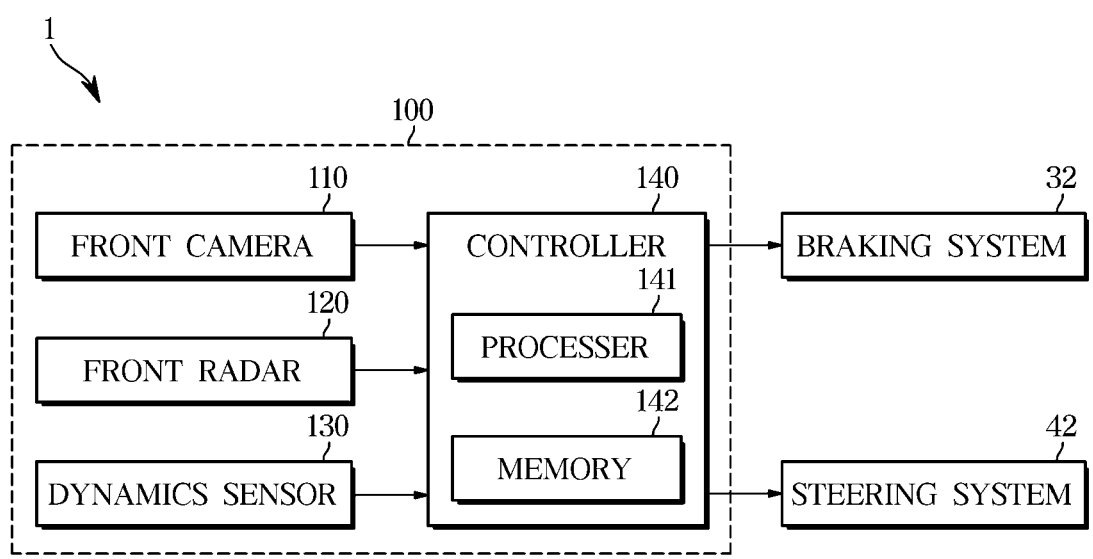
FIG. 2 is a control block diagram of a DAS according to an embodiment.
Figure 3:
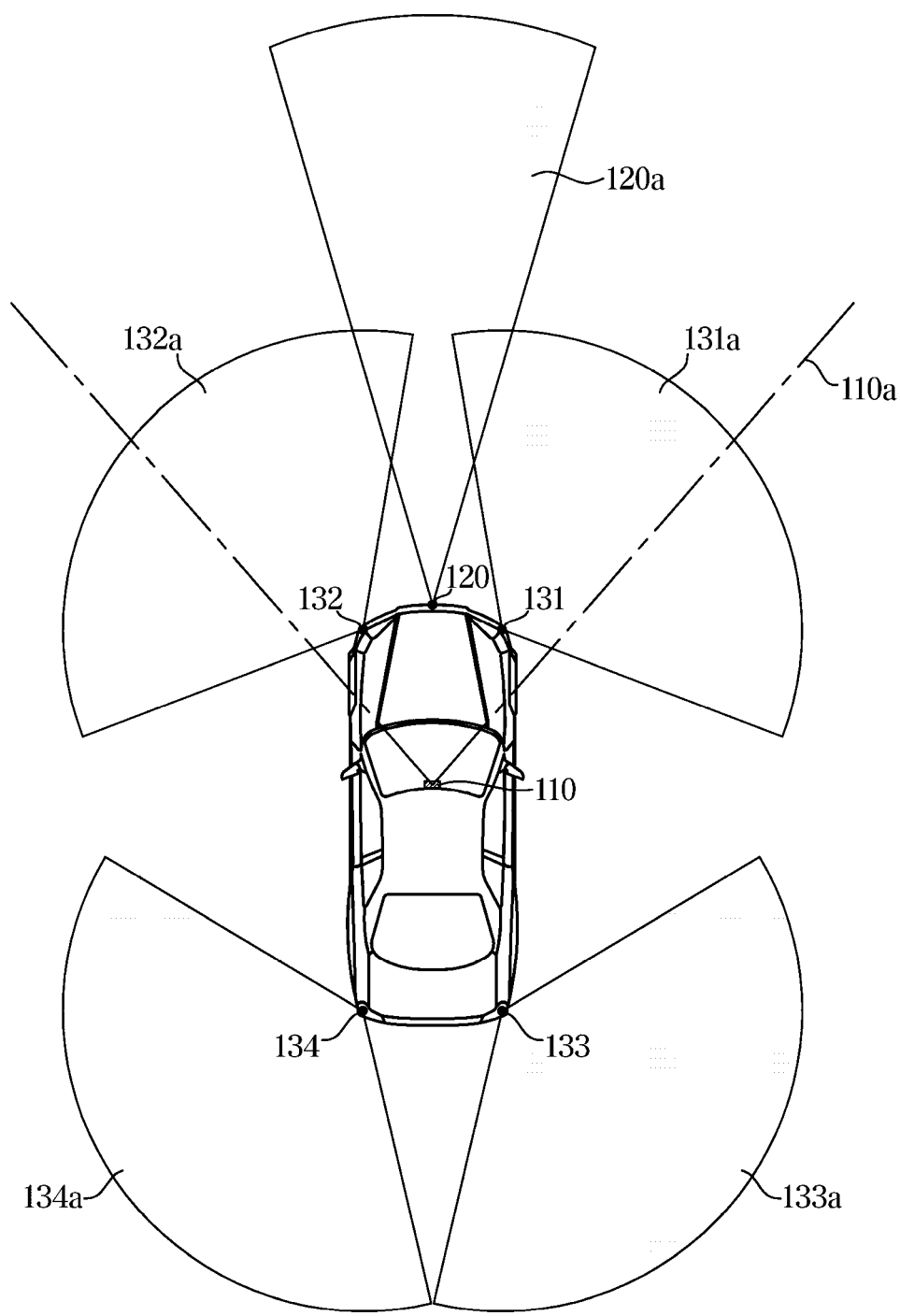
FIG. 3 illustrates a camera and a radar included in a DAS according to an embodiment.

FIG. 2 is a control block diagram of a driver assistance system according to an embodiment. FIG. 3 illustrates a camera and a radar included in a driver assistance system according to an embodiment.

Referring to FIG. 2, the vehicle 1 may include a braking system 32, a steering system 42, and an ADAS 100.

The braking system 32 may include the EBCM (31 in FIG. 1) and the braking device (30 in FIG. 1) described in conjunction with FIG. 1, and the steering system 42 may include the EPS (41 in FIG. 1) and the steering device (40 in FIG. 1).

The DAS 100 may include a front camera 110, a front radar 120, and a plurality of corner radars 130.

The front camera 110 may have a field of view 110a directed to the front of the vehicle 1 as shown in FIG. 3. The front camera 110 may be installed, for example, on the front windshield of the vehicle 1.

The front camera 110 may photograph image the front of the vehicle 1 and acquire image data regarding the front of the vehicle 1. The image data regarding the front of the vehicle 1 may include position with respect to another vehicle or pedestrian or cyclist or lane located in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to a controller 140. For example, the front camera 110 may be connected to the controller 140 through a vehicle communication network NT, through a hard wire, or through a printed circuit board (PCB).

The front camera 110 may transmit the image data of the front of the vehicle 1 to the controller 140.

The front radar 120 may have a field of sensing 120a directed to the front of the vehicle 1 as shown in FIG. 3. The front radar 120 may be installed, for example, on a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an obstacle. The front radar 120 may acquire front radar data from the transmission radio waves transmitted by the transmission antenna and the reflection radio waves received by the reception antenna. Front radar data may include position information and velocity information regarding another vehicle, a pedestrian, or a cyclist located in front of the vehicle 1. The front radar 120 may calculate the relative distance to the obstacle based on the phase difference (or time difference) between the transmission radio waves and the reflection radio waves, and calculate the relative velocity of the object based on the frequency difference between the transmission radio waves and the reflected radio waves.

The front radar 120 may be connected to the controller 140 through a vehicle communication network NT, a hard wire, or a printed circuit board. The front radar 120 may transmit the front radar data to the controller 140.

The dynamics sensor 130 is a variety of known sensors such as a wheel speed sensor, a steering angle sensor, and a yaw rate sensor, and may sense a driving speed, a steering angle and a yaw rate of the vehicle and transmit it to the controller 140 by disposing in an appropriate position such as a wheel or a steering wheel of a vehicle.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed to the front right side of the vehicle 1. The first corner radar 131 may be installed on the right side of a front bumper of the vehicle 1. The second corner radar 132 may have a field of sensing 132a directed to the front left side of the vehicle 1, and for example, may be installed on the left side of the front bumper of the vehicle 1. The third corner radar 133 may have a field of sensing 133a directed to the rear right side of the vehicle 1 and for example, may be installed on the right side of a rear bumper of the vehicle 1. The fourth corner radar 134 may have a field of sensing 134a directed to the rear left side of the vehicle 1 and for example, may be installed on the left side of the rear bumper of the vehicle 1.

Each of the first, second, third and fourth corner radars 131, 132, 133, and 134 may include a transmission antenna and a reception antenna. The first, second, third, and fourth corner radars 131, 132, 133 and 134 acquire first corner radar data, second corner radar data, third corner radar data, and fourth corner radar data, respectively. The first corner radar data may include distance information and velocity information regarding another vehicle, a pedestrian or a cyclist (hereinafter, referred to as "an obstacle") existing on the front right side of the vehicle 1. The second corner radar data may include distance information and velocity information regarding an obstacle existing on the front left side of the vehicle 1. The third and fourth corner radar data may respectively include distance information and velocity information regarding an obstacle existing on the rear right side of the vehicle 1 and distance information and velocity information regarding an object located on the rear left side of the vehicle 1, respectively.

Each of the first, second, third, and fourth corner radars 131, 132, 133 and 134 may be connected to the controller 140, for example, through a vehicle communication network NT, a hard wire, or a printed circuit board. The first, second, third, and fourth corner radars 131, 132, 133, and 134 may respectively transmit the first corner radar data, the second corner radar data, the third corner radar data, and the fourth corner radar data to the controller 140.

The controller 140 may include the ECU (101b in FIG. 1) of the camera module (101 in FIG. 1) and/or the ECU (102b in FIG. 1) of the radar module (102 in FIG. 1), and/or a separate integrated ECU.

The controller 140 may include a processor 141 and a memory 142.

The processor 141 may process the front image data of the front camera 110, the front radar data of the front radar 120, and the corner radar data of the plurality of corner radars 130, and generate a braking signal and a steering signal for controlling the braking system 32 and the steering system 42. For example, the processor 141 may include an image signal processor for processing the front image data of the front camera 110 and/or a digital signal processor for processing radar data of the radars 120 and/or a micro control unit (MCU) for generating a driving signal and/or a steering signal.

The processor 141 may detect obstacles (e.g., another vehicle, a pedestrian, a cyclist, and the like) in front of the host vehicle 1 based on the front image data of the front camera 110 and the front radar data of the front radar 120.

In detail, the processor 141 may acquire position (distance and direction) and relative velocity of the obstacles in front of the host vehicle 1 based on the front radar data of the front radar 120. The processor 141 may acquire position (direction) and type information (for example, whether the obstacle is another vehicle, a pedestrian, a cyclist, or the like) of the obstacle existing in front of the host vehicle 1 based on the front image data of the front camera 110. In addition, the processor 141 may match the obstacles detected by the front image data with the obstacles detected by the front radar data, and acquire the type information, the position and the relative velocity of the obstacles in front of the host vehicle 1 based on a result of the matching.

The processor 141 may generate a braking signal and a steering signal based on the type information, the position, and the relative velocity of front obstacles.

For example, the processor 141 may calculate a time to collision (TTC) between the vehicle 1 and the front obstacle based on the position (distance) and the relative velocity of the front obstacles, and warn the driver of a collision, transmits a braking signal to the braking system 32, or transmits steering signal to the steering system 42 based on a result of comparing the TTC with a predetermined reference time.

In response to a TTC less than a predetermined first reference time, the processor 141 may allow an alert to be output via audio and/or display. In response to the TTC less than a predetermined second reference time, the processor 141 may transmit a preliminary-braking signal to the braking system 32. In response to the TTC less than a predetermined third reference time, the processor 141 may transmit an emergency braking signal to the braking system 32. In this case, the second reference time is shorter than the first reference time, and the third reference time is shorter than the second reference time.

As another example, the processor 141 may calculate a distance to collision (DTC) based on the relative velocity of front obstacles, and warn the driver of a collision or transmit a braking signal to the braking system 32 based on a result of comparing the DTC with distances to the front obstacles.

The processor 141 may acquire position (distance and direction) and relative velocity (relative velocity) of the obstacles on the sides of the vehicle 1 (front right, front left, rear right, and rear left) based on corner radar data of the plurality of corner radars 130.

The processor 141 may transmit a steering signal to the steering system 42 based on the position (distance and direction) and the relative velocity of the obstacles on the sides of the vehicle 1.

The memory 142 may store programs and/or data for processing image data by the processor 141, programs and/or data for processing radar data by the processor 141, and programs and/or data for generating a braking signal and/or a steering signal by the processor 141.

The memory 142 may temporarily memorize the image data received from the front camera 110 and/or the radar data received from the radars 120, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

The DAS 100 is not limited to the diagram illustrated in FIG. 2, and may further include a LiDAR configured to scan around the vehicle 1 and sense the obstacles.

As such, the controller 140 may transmit a braking signal to the braking system 32 based on whether a collision with the front obstacle is predicted. If the side obstacle does not exist or the collision with the side obstacle is not predicted, the controller 140 may transmit a steering signal to the steering system 42 in order to avoid a collision with the front obstacle.

Meanwhile, before describing various embodiments described below, data processed by the controller 140 and a subject of acquiring the data will be described.

The vehicle 1 comprises a front image sensor having a field of view in front of the vehicle 1 and configured to acquire front image data; a front non-image sensor having a field of sensing directed to the front of the vehicle 1 and selected from the group consisting of the radar sensor and the LiDAR sensor, the front non-image sensor configured to acquire front sensing data; a side front non-image sensor having a field of sensing directed to the side of the vehicle 1 and selected from the group consisting of the radar sensor and the LiDAR sensor, the side non-image sensor configured to acquire side sensing data; a rear image sensor having a field of view in rear of the vehicle 1 and configured to acquire rear image data; and a rear non-image sensor having a field of sensing directed to the rear of the vehicle 1 and selected from the group consisting of the radar sensor and the LiDAR sensor, the rear non-image sensor configured to acquire rear sensing data.

The front image sensor and the front non-image sensor may detect a front obstacle located in front of the vehicle 1.

The side non-image sensor may detect a side obstacle, a front side obstacle, and a rear side obstacle located in the side, front side and rear side of the vehicle 1.

The side non-image sensor may independently sense the side obstacle, the front side obstacle, and the rear side obstacle located in the side, front side and rear side by mounting on in the corner position of the vehicle 1, and may detect the side obstacle, the front side obstacle and the rear side obstacle located in the front side and rear side together with the front image sensor, the front non-image sensor, the rear image sensor, and the rear non-image sensor by mounting on the side of the vehicle 1.

The rear image sensor and the rear non-image sensor may sense the rear obstacle located at the rear of the vehicle 1.

In addition, the disclosure is carried out on the basis of the on/off of a direction indicator lamp of the vehicle 1 when the adaptive cruise control (ACC) is activated.

For example, when the direction indicator lamp of the vehicle 1 is turned on, the controller 140 may determine that the driver is willing to change lanes, and execute a control algorithm to be described later. For example, when the left side of the direction indicator lamp is turned on, the controller 140 predicts that the driver will attempt to change lanes to the left lane, and performs control based on the activation of the non-image sensor on the left. Conversely, when the right side of the direction indicator lamp is turned on, the controller 140 predicts that the driver will attempt to change lanes to the right lane, and performs control based on the activation of the non-image sensor on the right.

Figure 4:
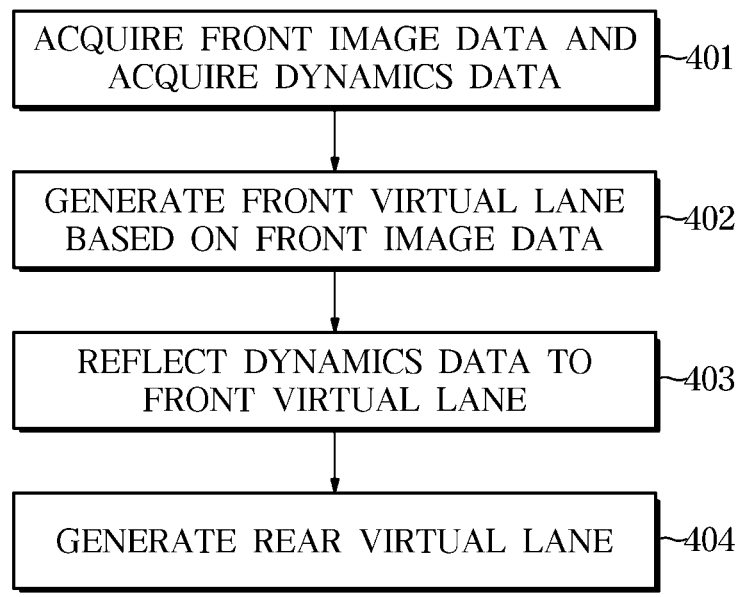
FIG. 4 is a flowchart of a driver assistance method according to an embodiment.
Figure 5:
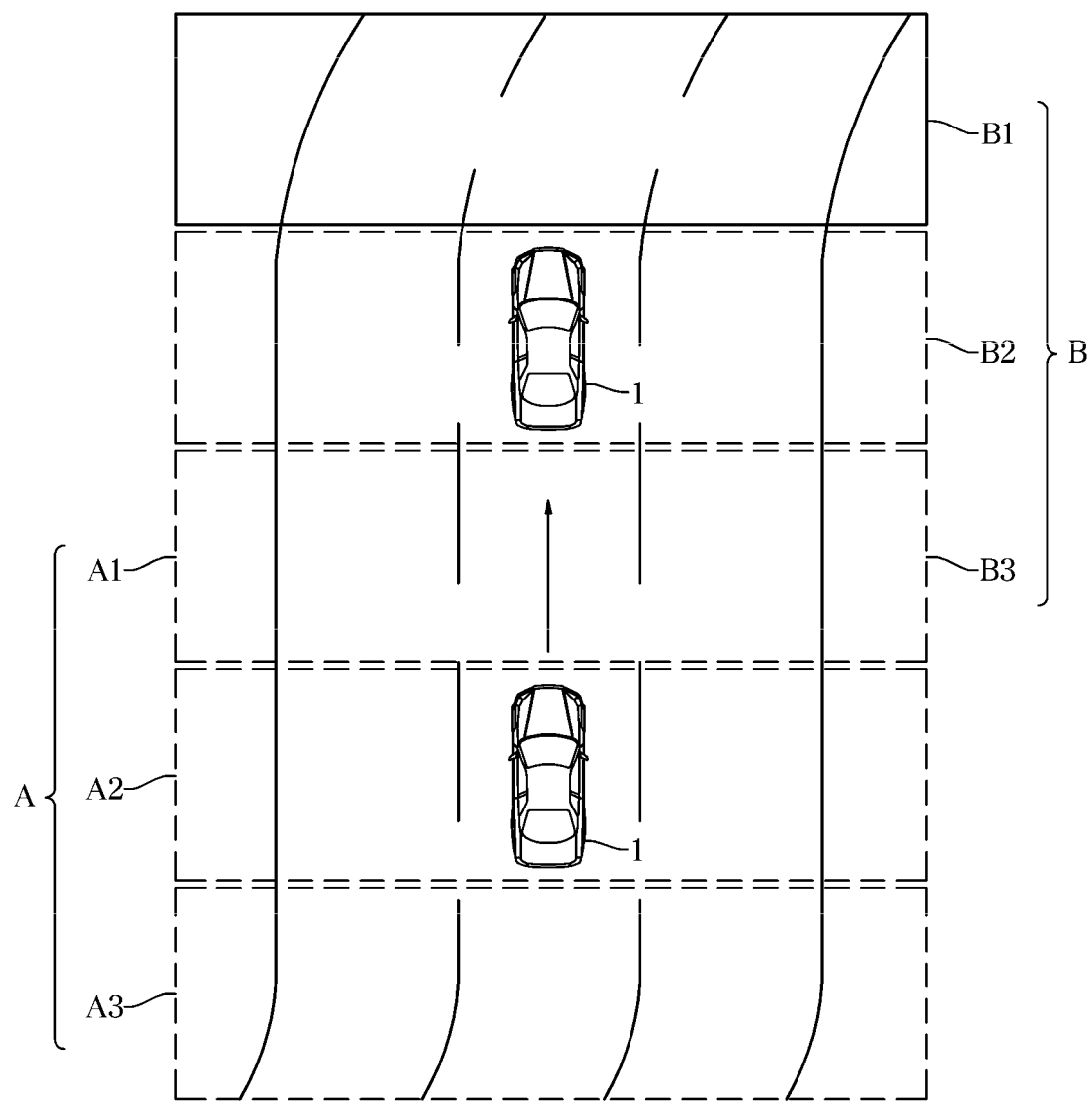
FIG. 5 illustrates an example of generation of a rear virtual lane according to FIG. 4.

FIG. 4 is a flowchart of a driver assistance method according to an exemplary embodiment. FIG. 5 illustrates an example of generation of a rear virtual lane according to FIG. 4. However, this is only a preferred embodiment for achieving the object of the present invention, and of course, some steps may be added or deleted as necessary. FIG. 4 will be described with reference to FIG. 5.

The controller 140 acquires front image data through the front camera installed in the vehicle 1 and having a field of view in front of the vehicle, and acquires dynamics data through a dynamics sensor installed in the vehicle 1 (401).

The controller 140 generates a front virtual lane based on the front image data, which is a front image (402). Specifically, the controller 140 may extract only a lane on the road through an image processing process for the photographed front image, and generate a front virtual lane based on the extracted lane with the vehicle 1. Referring to FIG. 5, it can be seen that a front virtual lane of the vehicle 1 before moving is generated in section A1.

The controller 140 reflects the dynamics data on the generated front virtual lane (403). Specifically, the controller 140 may store data on the front virtual lane of the vehicle 1 being traveled in real time, and when the vehicle 1 moves, generate a rear virtual lane by reflecting moving information of the vehicle 1 on the stored front virtual lane. This considers that the front of the advancing vehicle 1 becomes the rear of the vehicle 1 after advancing a certain distance.

The controller 140 generates a rear virtual lane based on the field of view in rear of the vehicle 1 based on the dynamics data (404). The generated rear virtual lane will be described with reference to FIG. 5.

Referring to FIG. 5, it can be seen that the vehicle 1 moves from section A2 to section B2. Here, the front in section A2 is the same as the rear in section B2. The controller 140 may generate a rear virtual image in which the vehicle 1 is based on the B2 section as a front virtual lane generated and stored on the basis of the section A2 of the vehicle 1.

For example, the controller 140 may acquire traveling velocity information of the vehicle 1 from the first position (section A2) to the second position (section B2) and determine the moving distance of the vehicle 1. At this time, the controller 140 calculates a required time to move from the first position to the second position. The controller 140 may use the front virtual lane acquired before the calculated required time as the rear virtual lane at the second position.

Figure 9:
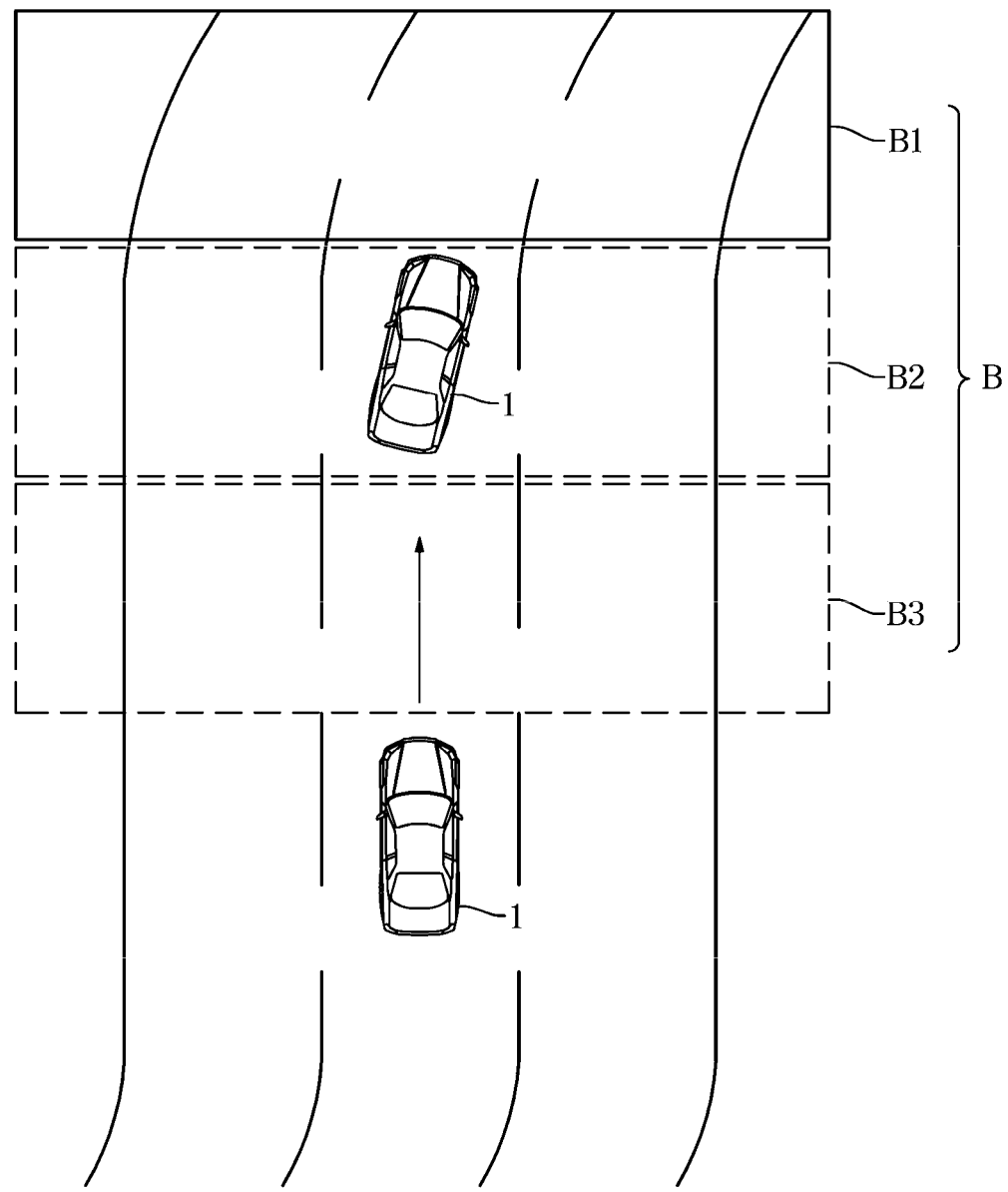
FIGS. 9 and 10 illustrate an example of generation of a rear virtual lane according to FIG. 8.
Figure 10:
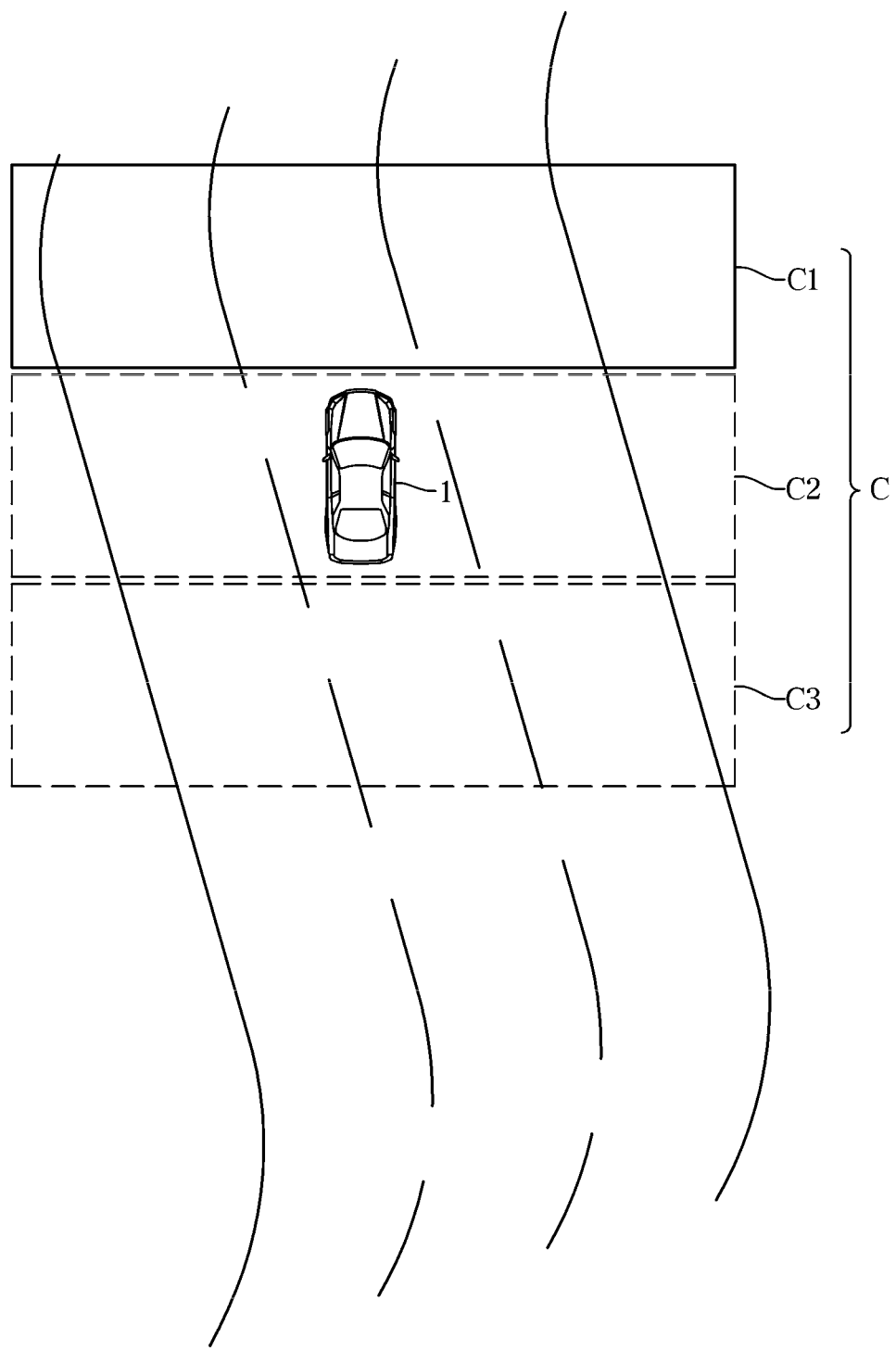

In addition, the controller 140 may reflect the steering angle information of the vehicle 1 in the generation of the rear virtual lane in addition to the traveling velocity information of the vehicle 1 described above. Accordingly, the difference in the viewing angle due to the change in the traveling direction of the vehicle 1 can be reflected in lane generation. Referring to FIGS. 9 and 10, if the driver performs a steering operation and the viewing angle of the vehicle 1 is changed, it can be seen that a rear virtual lane reflecting the changed steering angle (section B3 to section C3) is generated.

Meanwhile, as described above, the controller 140 may apply to the image itself in addition to generating the rear lane based on the front virtual lane. Specifically, the controller 140 may generate a rear image after the vehicle 1 moves based on the front image. This will be described in detail with reference to FIG. 6.

Figure 6:
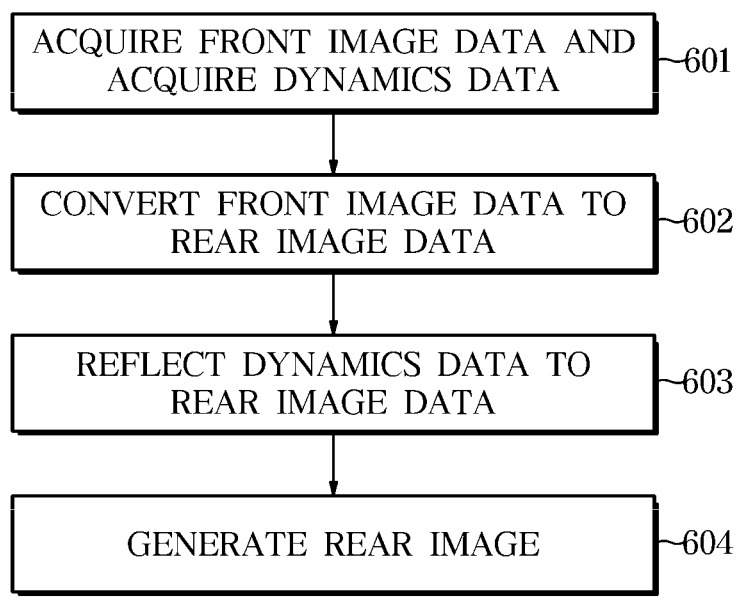
FIG. 6 is a flowchart of a driver assistance method according to an embodiment.

FIG. 6 is a flowchart of a driver assistance method according to an exemplary embodiment. However, this is only a preferred embodiment for achieving the object of the present invention, and of course, some steps may be added or deleted as necessary.

The controller 140 acquires front image data through the front camera installed in the vehicle 1 and having a field of view in front of the vehicle, and acquires dynamics data through a dynamics sensor installed in the vehicle 1 (601).

In this case, the controller 140 converts the front image data into the rear image data (602). Specifically, the controller 140 may estimate the rear lane based on the field of view in rear of the vehicle 1 by using the front image data before moving and the rear image data after moving.

The controller 140 reflects the dynamics data on the rear image data (603). Specifically, the controller 140 may store data on the front virtual lane of the vehicle 1 being traveled in real time, and when the vehicle 1 moves, generate a rear virtual lane by reflecting moving information of the vehicle 1 on the stored front virtual lane. This considers that the front of the advancing vehicle 1 becomes the rear of the vehicle 1 after advancing a certain distance.

The controller 140 generates a rear image based on the field of view in rear of the vehicle 1 based on the dynamics data (604). In addition, the controller 140 may extract only a lane on the road through an image processing process for the generated rear image and generate a rear virtual lane based on the field of view in rear of the vehicle 1.

Meanwhile, the detailed steps of the driver assistance method of FIG. 5 may also be applied to the driver assistance method of FIG. 6. The driver assistance method according to FIG. 5 is to generate a rear virtual lane based on the virtual lane by extracting a front virtual lane from the front image data, and the driver assistance method of FIG. 6 generates a rear image from the front image itself, and generates a rear virtual lane from the generated rear image.

Meanwhile, the rear virtual lane may be used to create an entire virtual lane through connection with the lateral virtual lane and the front virtual lane. In this regard, it will be described in detail with reference to FIGS. 7 to 10.

Figure 7:
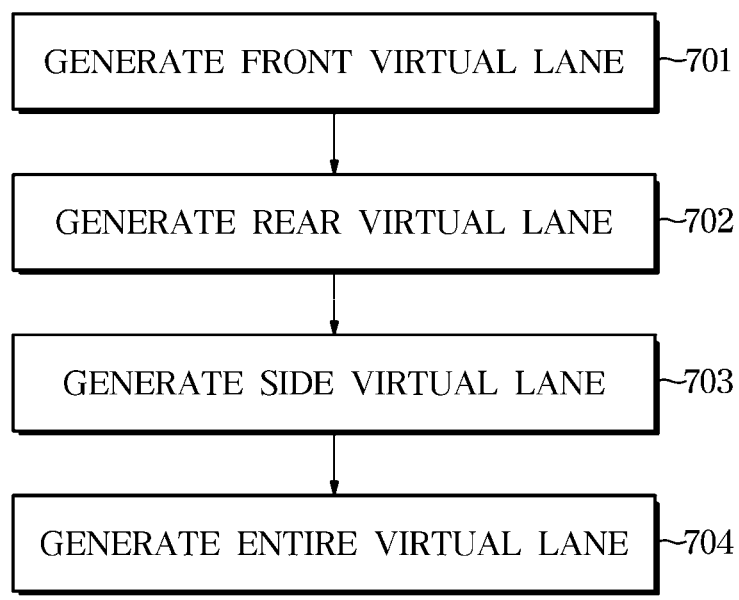
FIGS. 7 and 8 are flowcharts of a driver assistance method according to an embodiment.
Figure 8:
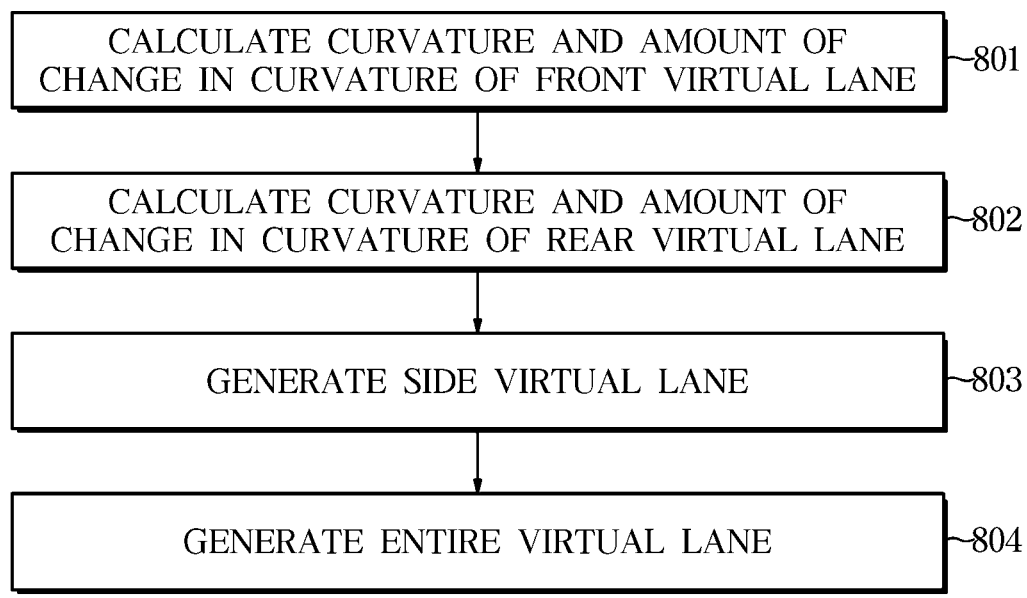

FIGS. 7 and 8 are flowcharts of a driver assistance method according to an exemplary embodiment, and FIGS. 9 and 10 illustrate an example of generation of a rear virtual lane according to FIG. 8. However, this is only a preferred embodiment for achieving the object of the present invention, and of course, some steps may be added or deleted as necessary. FIGS. 7 and 8 will be described with reference to FIGS. 9 and 10 together.

The controller 140 generates the front virtual lane (701). Specifically, the front virtual lane is generated by extracting only the lane on the road through an image processing process for the front image photographed by the front camera. The generated front virtual lane at this time is generated based on the current front image of the vehicle 1. Referring to FIG. 9, a front virtual lane corresponds to a virtual lane included in section B1.

The controller 140 generates the rear virtual lane (702). For a method for generating a rear virtual lane, refer to the description of FIGS. 4 to 6. Referring to FIG. 9, the rear virtual lane according to the present embodiment corresponds to a virtual lane included in section B3.

The controller 140 generates the side virtual lane (703). In this case, the side virtual lane may be generated through a side image acquired by a camera provided on the side of the vehicle 1, but the side virtual lane may be estimated by setting a time interval for the required time described above.

In addition, unlike the above-described method, the side virtual lane may be generated using the front virtual lane and the rear virtual lane. This will be described with reference to FIG. 8.

Referring to FIG. 8, the controller 140 calculates a curvature and an amount of change in the curvature of a front virtual lane (801). In this case, the amount of change in the curvature of the front virtual lane may be calculated by the curvature of the front virtual lane.

The controller 140 calculates a curvature and the amount of change in the curvature of the rear virtual lane. In this case, the amount of change in the curvature of the rear virtual lane may be calculated by the curvature of the rear virtual lane.

Next, the controller 140 generates the side virtual lane (803). For example, if it is determined that the curvature of the front virtual lane and the rear virtual lane are 0, the controller 140 may estimate that the curvature of the lateral virtual lane located between the front virtual lane and the rear virtual lane is also 0. In this case, the side virtual lane may be generated by being connected to a boundary of a front virtual lane and a boundary of a rear virtual lane. In addition, if it is determined that the curvature of the front virtual lane and the curvature of the rear virtual lane are the same value, the controller 140 may regard the vehicle 1 as driving on a curved road having a constant radius, and may generate a lateral virtual lane connected to a boundary between a front virtual lane and a rear virtual lane using a curve having the same curvature value.

If the side virtual lane is generated by the above-described steps, the controller 140 connects the front virtual lane, the side virtual lane, and the rear virtual lane to generate the entire virtual lane. Referring to FIG. 9, it can be seen that the entire virtual lane is generated by connecting the front virtual lane of section B1, the side virtual lane of section B2, and the rear virtual lane of section B3.

The controller 140 may sense whether an external object has deviated from the lane based on the generated entire virtual lane. According to an embodiment, when the radar sensor mounted on the vehicle 1 and having the field of view in rear of the vehicle senses a rear obstacle and the rear obstacle performs a lane change right behind the vehicle 1, the controller 140 may output a warning signal to inform the driver that the rear obstacle can approach the side of the vehicle 1.

Figure 11:
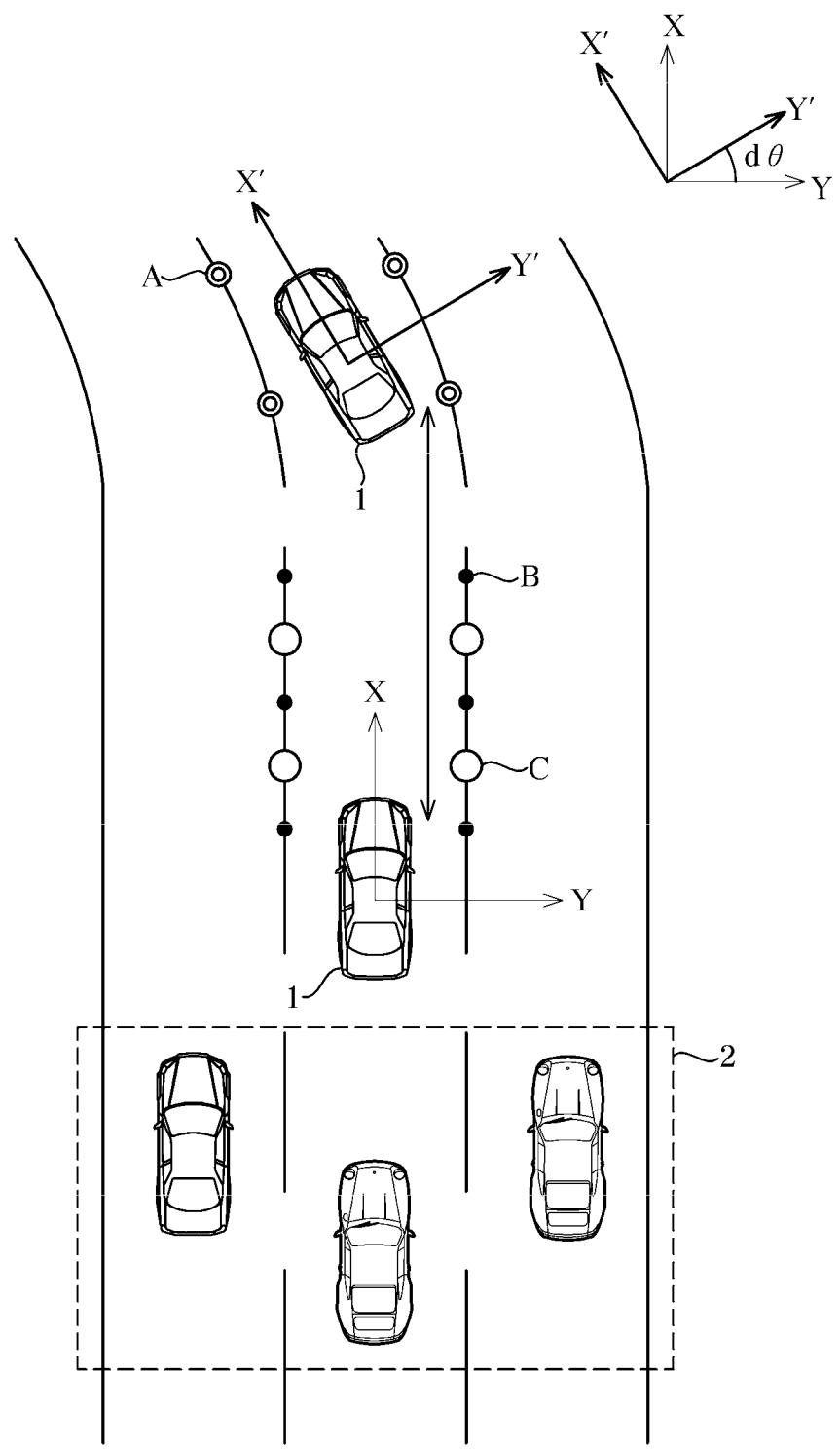
FIG. 11 is a diagram for describing a process of deriving coordinate information of a rear virtual lane.

FIG. 11 is a diagram for describing a process of deriving coordinate information of a rear virtual lane.

As described above, the rear virtual lane may be generated based on the front virtual lane. In this case, the front virtual lane and the rear virtual lane may be implemented as a set of coordinate information on a coordinate system on the basis of the vehicle 1.

When acquiring the curvature of the lane previously stored or acquired through the front camera 110, the controller 140 may acquire coordinate information constituting the front virtual lane. For example, the controller 140 may acquire a y-axis value based on regular intervals toward the x-axis. Here, the acquired coordinate information (x, y) for the front virtual lane is used to generate the rear virtual lane.

Meanwhile, as described above, when acquiring coordinate information for the front virtual lane (hereinafter, first coordinate information), the controller 140 uses Equation 1 below to acquire coordinate information for the rear virtual lane.

$$\begin{pmatrix} \cos(\gamma * dt) & -\sin(\gamma * dt) & v * dt \\ \sin(\gamma * dt) & \cos(\gamma * dt) & 0 \\ 0 & 0 & 1 \end{pmatrix}$$ [Equation 1]

(v=velocity of vehicle, $\dot{\theta}=\gamma$=angular velocity of vehicle)

The controller 140 may derive coordinate information for the rear virtual lane (hereinafter, second coordinate information) by applying the first coordinate information to Equation 2. Specifically, the controller 140 may derive second coordinate information by calculating a 3×1 matrix having x, y, and 1 values for Equation 2.

A plurality of first coordinate information is accumulated as the driving distance of the vehicle 1 increases. The controller 140 converts the plurality of first coordinate information A into a plurality of second coordinate information B according to a predetermined period. In this case, for the accuracy of the rear virtual lane, the controller 140 may derive the third coordinate information C by calculating an average value of the second coordinate information B generated at regular intervals. The controller 140 according to an embodiment may generate the rear virtual lane through the third coordinate information C. For example, the controller 140 may derive an n-order equation capable of estimating an actual lane by applying the least square method to the acquired plurality of second coordinate information (B) or the acquired plurality of third coordinate information (C).

When the rear virtual lane is generated based on the above-described method, the controller 140 performs lane keeping assist (LKA) and lane following assist (LFA) based on the generated rear virtual lane. Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

According to an aspect of the disclosure, it is possible to identify the rear lane of the field of view in rear of the vehicle with only the front camera. That is, since it is possible to identify the rear lane of the field of view in rear of the vehicle without using the rear camera, a separate sensor for identifying the rear lane does not need to be installed.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. An apparatus for assisting driving of a vehicle, the apparatus comprising:
   a front camera mounted on the vehicle and having a field of view in front of the vehicle, the front camera configured to acquire front image data;
   a dynamics sensor mounted on the vehicle and configured to acquire dynamics data that is a motion state of the vehicle; and
   a controller including a processor configured to process the front image data and the dynamics data,
   wherein the controller is configured to:
      generate, when the vehicle is at a first position, a front virtual lane on the basis of the field of view in front of the vehicle based on the front image data,
      in response to the vehicle moving from the first position to a second position distanced from the first position, generate a rear virtual lane on the basis of a field of view in rear of the vehicle based on (i) the dynamics data of the vehicle moving from the first position to the second position and (ii) the front virtual lane generated when the vehicle is at the first position,
      calculate a curvature of the front virtual lane and a curvature of the rear virtual lane, and
      generate a side virtual lane which is connected to the front virtual lane and the rear virtual lane on the basis of a field of view on a side of the vehicle based on the curvature of the front virtual lane and the curvature of the rear virtual lane.

2. The apparatus of claim 1, wherein the controller is configured to
   acquire a moving distance of the vehicle based on traveling speed information of the vehicle from the first position to the second position,
   calculate a required time from the first position to the second position, and
   in response the vehicle moving from the first position to the second position, generate the rear virtual lane based on the front virtual lane acquired before the required time.

3. The apparatus of claim 2, wherein the controller is configured to generate an entire virtual lane in which the front virtual lane and the rear virtual lane at the second position are connected to each other.

4. The apparatus of claim 3, wherein the controller is configured to
   calculate the curvature of the front virtual lane at the second position and the curvature of the rear virtual lane at the second position,
   generate the side virtual lane on the basis of the field of view on the side of the vehicle based on the curvature of the front virtual lane at the second position and the curvature of the rear virtual lane at the second position, and
   generate the entire virtual lane in which the front virtual lane, the side virtual lane, and the rear virtual lane are connected to each other.

5. The apparatus of claim 1, wherein the controller is configured to acquire front coordinate information for the front virtual lane, acquire rear coordinate information for the rear of the vehicle through a predetermined transformation matrix in which the vehicle and an angular velocity of the vehicle are reflected in the front coordinate information, generate the rear virtual lane based on the rear coordinate information, and perform a lane keeping assist (LKA) and a lane following assist (LFA) based on the rear virtual lane.

6. The apparatus of claim 1, wherein the controller is configured to receive a steering angle of the vehicle, and regenerate the rear virtual lane based on the steering angle.

7. The apparatus of claim 1, further comprising a radar sensor mounted on the vehicle and having a field of sensing directed to the rear of the vehicle, the radar sensor configured to sense a rear obstacle,
   wherein the controller is configured to output a warning signal in response to the rear obstacle being sensed and the rear obstacle departing the rear virtual lane.

8. The apparatus of claim 1, wherein the dynamics sensor includes a wheel speed sensor, a steering angle sensor, and a yaw rate sensor, and is configured to obtain a traveling speed, a steering angle, and a yaw rate of the vehicle.

9. An apparatus for assisting driving of a vehicle, the apparatus comprising:
a front camera mounted on the vehicle and having a field of view in front of the vehicle, the front camera configured to acquire front image data;
a dynamics sensor mounted on the vehicle and configured to acquire dynamics data that is a motion state of the vehicle; and
a controller including a processor configured to process the front image data and the dynamics data,
wherein the controller is configured to:
convert the front image data acquired when the vehicle is at a first position into rear image data on the basis of a field of view in rear of the vehicle,
in response to the vehicle moving from the first position to a second position distanced from the first position, generate a rear image of the vehicle based on (i) the dynamics data of the vehicle moving from the first position to the second position and (ii) the rear image data converted from the front image data acquired when the vehicle is at the first position,
generate a front virtual lane on the basis of the field of view in front of the vehicle based on the front image data,
generate a rear virtual lane on the basis of a field of view in rear of the vehicle based on the rear image,
calculate a curvature of the front virtual lane and a curvature of the rear virtual lane, and
generate a side virtual lane which is connected to the front virtual lane and the rear virtual lane on the basis of a field of view on a side of the vehicle based on the curvature of the front virtual lane and the curvature of the rear virtual lane.

10. The apparatus of claim 9, wherein
the controller is configured to
acquire a moving distance of the vehicle based on traveling speed information of the vehicle from the first position to the second position,
calculate a required time from the first position to the second position, and
in response to the vehicle moving from the first position to the second position, generate the rear virtual lane based on the front lane acquired before the required time.

11. The apparatus of claim 10, wherein the controller is configured to generate an entire virtual lane in which the front virtual lane and the rear virtual lane at the second position are connected to each other.

12. The apparatus of claim 11, wherein
the controller is configured to
calculate the curvature of the front virtual lane at the second position and the curvature of the rear virtual lane at the second position,
generate the side virtual lane on the basis of the field of view on the a side of the vehicle based on the curvature of the front virtual lane at the second position and the curvature of the rear virtual lane at the second position, and
generate the entire virtual lane in which the front virtual lane, the side virtual lane, and the rear virtual lane are connected to each other.

13. The apparatus of claim 12, wherein the controller is configured to calculate an amount of change in the curvature of the front virtual lane at the second position and an amount of change in the curvature of the rear virtual lane at the second position, and generate the side virtual lane.

14. The apparatus of claim 9, wherein the controller is configured to receive a steering angle of the vehicle, and regenerate the rear virtual lane based on the steering angle.

15. The apparatus of claim 9, further comprising a radar sensor mounted on the vehicle and having a field of sensing directed to the rear of the vehicle, the radar sensor configured to sense a rear obstacle,
wherein the controller is configured to output a warning signal in response to the rear obstacle being sensed and the rear obstacle departing the rear virtual lane.

16. The apparatus of claim 9, wherein the dynamics sensor includes a wheel speed sensor, a steering angle sensor, and a yaw rate sensor, and is configured to obtain a traveling speed, a steering angle, and a yaw rate of the vehicle.

17. A method of controlling an apparatus for assisting driving of a vehicle, the method comprising:
acquiring, through a front camera of the apparatus, front image data;
acquiring, through a dynamics sensor of the apparatus, dynamics data;
generating, when the vehicle is at a first position, through a controller of the apparatus, a front virtual lane on the basis of a field of view in front of the vehicle based on the front image data;
generating, in response to the vehicle moving from the first position to a second position distanced from the first position, through the controller, a rear virtual lane on the basis of a field of view in rear of the vehicle based on (i) the dynamics data of the vehicle moving from the first position to the second position and (ii) the front virtual lane generated when the vehicle is at the first position,
calculating, through the controller, a curvature of the front virtual lane and a curvature of the rear virtual lane, and
generating, through the controller, a side virtual lane which is connected to the front virtual lane and the rear virtual lane on the basis of a field of view on a side of the vehicle based on the curvature of the front virtual lane and the curvature of the rear virtual lane,
wherein the driving of the vehicle is assisted by using the generated front virtual lane, the generated rear virtual lane, and the generated side virtual lane connected to the front virtual lane and the rear virtual lane.

18. The method of claim 17, wherein the generating of the rear virtual lane includes
acquiring a moving distance of the vehicle based on traveling speed information of the vehicle from the first position to the second position,
calculating a required time from the first position to the second position, and
in response to the vehicle moving from the first position to the second position, generating the rear virtual lane based on the front virtual lane acquired before the required time.

19. The method of claim 18, further comprising:
calculating the curvature of the front virtual lane at the second position and the curvature of the rear virtual lane at the second position,
generating the side virtual lane based on the field of view on the side of the vehicle based on the curvature of the front virtual lane at the second position and the curvature of the rear virtual lane at the second position, and generating an entire virtual lane in which the front virtual lane, the side virtual lane, and the rear virtual lane are connected to each other.

* * * * *